United States Patent [19]

Pao

[11] Patent Number: 5,734,796
[45] Date of Patent: Mar. 31, 1998

[54] SELF-ORGANIZATION OF PATTERN DATA WITH DIMENSION REDUCTION THROUGH LEARNING OF NON-LINEAR VARIANCE-CONSTRAINED MAPPING

[75] Inventor: Yoh Han Pao, Cleveland Heights, Ohio

[73] Assignee: AI Ware, Inc., Beachwood, Ohio

[21] Appl. No.: 536,059

[22] Filed: Sep. 29, 1995

[51] Int. Cl.$^6$ .................................................. G06E 7/00
[52] U.S. Cl. ............................... 395/22; 395/21; 395/23
[58] Field of Search ............................... 382/155–159; 364/413.01; 358/518; 395/20–25, 27

[56] References Cited

U.S. PATENT DOCUMENTS

| | | | |
|---|---|---|---|
| 5,003,490 | 3/1991 | Castelaz et al. | 395/22 |
| 5,113,483 | 5/1992 | Keeler et al. | 395/23 |
| 5,200,816 | 4/1993 | Rose | 358/518 |
| 5,218,529 | 6/1993 | Meyer et al. | 364/413.01 |
| 5,293,456 | 3/1994 | Guez et al. | 395/24 |
| 5,335,291 | 8/1994 | Kramer et al. | 382/158 |
| 5,546,503 | 8/1996 | Abe et al. | 395/23 |

OTHER PUBLICATIONS

Baldi P., & Hornik, K. (1989). Neural networks and principal component analysis: learning from examples without local minima. *Neural Networks*, 2, 53–58.

Bourland, H., & Kamp Y. (1988). Auto-association by multilayer perceptrons and singular value decomposition. *Biological Cybernetics*, 59, 291–294.

Carpenter, G.A. & Grossberg, S. (1987). ART2: Self-organization of stable category recognition codes for analog input patterns. *Applied Optics*. 26, 4919–4930.

Fukunaga, K., & Koontz, W. L. G. (1970). Application of the Karhunen–Loeve expansion to feature selection and ordering. *IEEE Transactions on Computers*, 19, 311–318.

Kohonen, T. (1982). Self–organised formation of topologically correct feature maps. *Biological Cybernetics*, 43 59–69.

Kohonen, T. (1995). *Self–Organizing Maps*, Springer–Verlag, Berlin.

Kramer, M. (1991). Nonlinear principal component analysis using autoassociative feedforward neural networks. *AICHE*, 37, 233–243.

Linsker, R. (1986). From basic network principles to neural architecture. *Proceedings of the National Academy of Science, USA*, 83, 7508–7512, 8390–8394, 8779–8783.

Oja, E. (1982). A simplified neuron model as a principal component analyzer. *Journal of Mathematics and Biology*, 15, 267–273.

Oja, E. (1991). Data compression, feature extraction and autoassociation feedforward neural networks, In *Artificial Neural Networks*, eds. T. Kohonen, O. Simula, and J. Kangas, Elsevier Science Amsterdam, 737–745.

Sanger, T. D. (1989). Optimal Unsupervised learning in a single–layer linear feedforward neural network. *Neural Networks*, 2, 459–465.

*Primary Examiner*—Tariq R. Hafiz
*Attorney, Agent, or Firm*—Benesch, Friedlander, Coplan & Aronoff LLP

[57] ABSTRACT

The subject system provides a self-organized reduced-dimension remapping of pattern data. The system functions to a mapping from an original pattern space to a reduced-dimension space in an unsupervised nonlinear manner, but with a constraint that the overall variance in a representation of the data be conserved. This approach relates to but is different from both the Karhuren-Loeve (K-L) transform and auto-associative approaches which emphasize feature extraction, and also from the Advanced Reasoning Tool (ART) and feature mapping approaches which emphasize category formation based on similarity in the original representation. The subject system is highly efficient computationally. The reduced-dimension representation is suitably further simplified with ART or feature mapping techniques, as appropriate and as desired.

8 Claims, 13 Drawing Sheets

| No. | x1 | x2 | x3 | x4 | x5 | y |
|---|---|---|---|---|---|---|
| 1 | 0.000 | 0.000 | 0.350 | 0.600 | 0.600 | 100.0 |
| 2 | 0.000 | 0.300 | 0.100 | 0.000 | 0.600 | 101.0 |
| 3 | 0.000 | 0.300 | 0.000 | 0.100 | 0.600 | 100.0 |
| 4 | 0.150 | 0.150 | 0.100 | 0.600 | 0.000 | 97.3 |
| 5 | 0.150 | 0.000 | 0.150 | 0.600 | 0.100 | 97.8 |
| 6 | 0.000 | 0.300 | 0.490 | 0.600 | 0.051 | 96.7 |
| 7 | 0.000 | 0.300 | 0.000 | 0.489 | 0.211 | 97.0 |
| 8 | 0.150 | 0.127 | 0.023 | 0.600 | 0.100 | 97.3 |
| 9 | 0.150 | 0.000 | 0.311 | 0.539 | 0.000 | 99.7 |
| 10 | 0.000 | 0.300 | 0.285 | 0.415 | 0.000 | 99.8 |
| 11 | 0.000 | 0.080 | 0.350 | 0.570 | 0.000 | 100.0 |
| 12 | 0.150 | 0.150 | 0.266 | 0.434 | 0.000 | 99.5 |
| 13 | 0.150 | 0.150 | 0.082 | 0.018 | 0.600 | 101.9 |
| 14 | 0.000 | 0.158 | 0.142 | 0.100 | 0.600 | 100.7 |
| 15 | 0.000 | 0.000 | 0.300 | 0.416 | 0.239 | 100.9 |
| 16 | 0.150 | 0.034 | 0.116 | 0.444 | 0.600 | 101.2 |
| 17 | 0.068 | 0.121 | 0.175 | 0.332 | 0.192 | 98.2 |
| 18 | 0.067 | 0.098 | 0.234 | 0.000 | 0.270 | 100.5 |
| 19 | 0.000 | 0.300 | 0.192 | 0.208 | 0.300 | 100.6 |
| 20 | 0.150 | 0.150 | 0.174 | 0.226 | 0.300 | 100.6 |
| 21 | 0.075 | 0.225 | 0.276 | 0.424 | 0.000 | 99.1 |
| 22 | 0.075 | 0.225 | 0.000 | 0.100 | 0.600 | 100.4 |
| 23 | 0.000 | 0.126 | 0.174 | 0.600 | 0.100 | 98.4 |
| 24 | 0.075 | 0.000 | 0.225 | 0.600 | 0.100 | 98.2 |
| 25 | 0.150 | 0.150 | 0.000 | 0.324 | 0.376 | 99.4 |
| 26 | 0.000 | 0.300 | 0.192 | 0.508 | 0.000 | 98.6 | x1 = BUTANE
x2 = ISOPENETANE
x3 = REFORMATE
x4 = CAT CRACKED
x5 = ALKYLATE
y = RESEARCH OCTANE AT 2.0 GRAMS OF LEAD/GALLON

*Fig. 11*

TABLE 2: TIME-DEPENDENT SENSOR DATA PROFILES

| NO. | t:1-5 | t:6-11 | t:12-17 | t:18-23 | t:24-29 | FAULT |
|---|---|---|---|---|---|---|
| 1 | 0.65190 | 0.13019 | 0.31398 | 0.69901 | 0.30067 | 0.00000 |
| 2 | 0.27577 | 0.56790 | 0.24946 | 0.61443 | 0.70156 | 1.00000 |
| 3 | 0.86528 | 0.30303 | 0.10538 | 0.56716 | 0.58797 | 0.00000 |
| 4 | 0.15642 | 0.83277 | 0.58065 | 0.37313 | 0.58352 | 1.00000 |
| 5 | 0.82369 | 0.27834 | 0.24731 | 0.67413 | 0.90200 | 0.00000 |
| 6 | 0.35353 | 0.67116 | 0.16559 | 0.65920 | 0.82405 | 1.00000 |
| 7 | 0.40958 | 0.35241 | 0.41290 | 0.73881 | 0.70601 | 0.00000 |
| 8 | 0.35443 | 0.33782 | 0.55054 | 0.70647 | 0.71269 | 1.00000 |
| 9 | 0.54702 | 0.57350 | 0.59355 | 0.67413 | 0.72606 | 0.00000 |
| 10 | 0.34177 | 0.60718 | 0.79355 | 0.79851 | 0.64588 | 1.00000 |
| 11 | 0.47920 | 0.65208 | 0.67312 | 0.83582 | 0.74833 | 0.00000 |
| 12 | 0.35353 | 0.57800 | 0.94409 | 0.95025 | 0.74610 | 1.00000 |
| 13 | 0.47197 | 0.32099 | 0.36559 | 0.58209 | 0.52561 | 0.00000 |
| 14 | 0.36528 | 0.39843 | 0.44731 | 0.61940 | 0.55457 | 1.00000 |
| 15 | 0.44123 | 0.29854 | 0.34624 | 0.57711 | 0.55457 | 0.00000 |
| 16 | 0.35805 | 0.35354 | 0.42150 | 0.59701 | 0.56793 | 1.00000 |
| 17 | 0.49005 | 0.32997 | 0.41505 | 0.72139 | 0.67929 | 0.00000 |
| 18 | 0.31284 | 0.43547 | 0.43656 | 0.72388 | 0.70601 | 1.00000 |
| 19 | 0.43309 | 0.31874 | 0.39785 | 0.71642 | 0.73497 | 0.00000 |
| 20 | 0.34991 | 0.36251 | 0.44946 | 0.71144 | 0.73051 | 1.00000 |
| 21 | 0.46745 | 0.26936 | 0.40860 | 0.69652 | 0.72160 | 0.00000 |
| 22 | 0.35262 | 0.37261 | 0.42366 | 0.70398 | 0.70601 | 1.00000 |
| 23 | 0.59042 | 0.25253 | 0.48602 | 0.78358 | 0.82628 | 0.00000 |
| 24 | 0.38427 | 0.37486 | 0.48172 | 0.79851 | 0.80401 | 1.00000 |
| 25 | 0.38156 | 0.19753 | 0.40645 | 0.63930 | 0.83296 | 0.00000 |
| 26 | 0.34810 | 0.52189 | 0.44516 | 0.68906 | 0.72160 | 1.00000 |
| 27 | 0.75769 | 0.91134 | 0.44301 | 0.61194 | 0.51225 | 0.00000 |
| 28 | 0.41863 | 1.00000 | 1.00000 | 0.59453 | 0.49220 | 1.00000 |
| 29 | 0.50723 | 0.36364 | 0.40645 | 0.68159 | 0.71715 | 0.00000 |
| 30 | 0.34991 | 0.47250 | 0.45806 | 0.70149 | 0.70156 | 1.00000 |
| 31 | 0.54069 | 0.24691 | 0.38279 | 0.70647 | 0.73051 | 0.00000 |
| 32 | 0.38788 | 0.40404 | 0.38710 | 0.70149 | 0.72383 | 1.00000 |
| 33 | 0.41320 | 0.32660 | 0.41075 | 0.68408 | 0.71715 | 0.00000 |
| 34 | 0.34991 | 0.34007 | 0.49247 | 0.68906 | 0.70379 | 1.00000 |
| 35 | 0.39873 | 0.35354 | 0.44516 | 0.68906 | 0.69710 | 0.00000 |
| 36 | 0.33906 | 0.32323 | 0.58065 | 0.70149 | 0.69710 | 1.00000 |
| 37 | 0.29747 | 0.26824 | 0.42366 | 0.74378 | 0.85746 | 0.00000 |
| 38 | 0.30561 | 0.21886 | 0.36129 | 0.59950 | 0.67038 | 1.00000 |

Fig. 12

TABLE 3: SEMICONDUCTOR CRYSTAL STRUCTURE PARAMETERS AND BAND GAPS

| No. | COMPOUNDS | u | a | c | c/a | GAP |
|---|---|---|---|---|---|---|
| 1 | AgGaS2 | 0.28 | 5.75722 | 10.3036 | 1.790 | 2.55 |
| 2 | AgALS2 | 0.3 | 5.73 | 10.3 | 1.798 | 3.13 |
| 3 | AgGaSe2 | 0.27 | 5.755 | 10.28 | 1.786 | 1.8 |
| 4 | CdSiAs2 | 0.298 | 5.884 | 10.882 | 1.849 | 1.55 |
| 5 | CdGeP2 | 0.2839 | 5.738 | 10.765 | 1.876 | 1.72 |
| 6 | AgAlTe2 | 0.26 | 6.296 | 11.83 | 1.879 | 2.25 |
| 7 | CdGeAs2 | 0.278 | 5.9432 | 11.2163 | 1.887 | 0.6 |
| 8 | AgGaTe2 | 0.26 | 6.3197 | 11.9843 | 1.896 | 1.1 |
| 9 | AgLnTe2 | 0.25 | 5.836 | 11.1789 | 1.916 | 1.9 |
| 10 | CdSnP2 | 0.265 | 5.9 | 11.518 | 1.952 | 1.7 |
| 11 | CuAlSe2 | 0.26 | 5.6103 | 10.982 | 1.957 | 2.6 |
| 12 | AgLnSe2 | 0.25 | 6.455 | 12.644 | 1.959 | 0.96 |
| 13 | CdSnAs2 | 0.262 | 6.09 | 11.94 | 1.961 | 0.26 |
| 14 | ZnGeP2 | 0.25816 | 5.46 | 10.71 | 1.962 | 2.34 |
| 15 | CuAlS2 | 0.27 | 5.31 | 10.42 | 1.962 | 3.35 |
| 16 | ZnGeAs2 | 0.25 | 5.66 | 11.154 | 1.971 | 0.75 |
| 17 | CuFeS2 | 0.27 | 5.289 | 10.423 | 1.971 | 0.53 |
| 18 | AgAlSe2 | 0.27 | 5.95 | 10.75 | 1.807 | 2.6 |
| 19 | CuAlTe2 | 0.25 | 5.964 | 11.78 | 1.975 | 2.06 |
| 20 | CuGaTe2 | 0.25 | 6.013 | 11.934 | 1.985 | 1.24 |
| 21 | CuTiSe2 | 0.25 | 5.832 | 11.63 | 1.994 | 1.07 |
| 22 | ZnSnAs2 | 0.231 | 5.851 | 11.702 | 2.000 | 0.65 |
| 23 | ZnSnP2 | 0.238 | 5.65 | 11.3 | 2.000 | 1.66 |
| 24 | ZnLnSe2 | 0.224 | 5.784 | 11.614 | 2.008 | 0.95 |
| 25 | CuLnS2 | 0.2 | 5.5228 | 11.1321 | 2.106 | 1.54 |
| 26 | CuGaS2 | 0.25 | 5.555 | 11.0036 | 1.981 | 1.71 |

Fig. 13

SELF-ORGANIZATION OF PATTERN DATA WITH DIMENSION REDUCTION THROUGH LEARNING OF NON-LINEAR VARIANCE-CONSTRAINED MAPPING

BACKGROUND OF THE INVENTION

This application pertains to the art of artificial intelligence, and more particularly to a system for organizing a large body of pattern data so as to organize it to facilitate understanding of features.

The subject system has particular application to analysis of acquired, empirical data, such as chemical characteristic information, and will be described with particular reference thereto. However, it will be appreciated that the subject system is suitably adapted to analysis of any set of related data so as to allow for visualization and understanding of the constituent elements thereof.

It is difficult to make sense out of a large body of multi-featured pattern data. Actually the body of data need not be large; even a set of 400 patterns each of six features would be quite difficult to "understand." A concept of self-organization has to do with that type of situation and can be understood in terms of two main approaches to that task. In one case, an endeavor is directed to discovering how the data are distributed in pattern space, with the intent of describing large bodies of patterns more simply in terms of multi-dimensional clusters or in terms of some other distribution, as appropriate. This is a dominant concern underlying the Advanced Reasoning Tool (ART) and feature map approaches.

In a remaining case, effort is devoted to dimension reduction. The corresponding idea is that the original representation, having a large number of features, is redundant in its representation, with several features being near repetitions of each other. In such a situation, a principal feature extraction is accompanied by dimension reduction may simplify the description of each and all the patterns. Clustering is suitably achieved subsequently in the reduced dimension space. The Karhunen-Loeve (K-L) transform, neural-net implementations of the K-L transform, and the auto-associative mapping approach are all directed to principal component analysis (PCA), feature extraction and dimension reduction.

In actuality the two streams of activity are not entirely independent. For example the ART approach has a strong "winner-take-all" mechanism in forming of its clusters. It is suitably viewed as "extracting" the principal prototypes, and forming a reduced dimension description in terms of a few category prototypes. Similarly, the feature map approach aims at collecting similar patterns together through lateral excitation-inhibition so that patterns with similar features are mapped into contiguous regions in a reduced dimension feature map. That method clusters and reduces dimensions.

A new approach to this same task of self-organization is described in herein. The idea is that data be subjected to a nonlinear mapping from the original representation to one of reduced dimensions. Such mapping is suitably implemented with a multilayer feedforward neural net. Net parameters are learned in an unsupervised manner based on the principle of conservation of the total variance in the description of the patterns.

The concept of dimension reduction is somewhat strange in itself. It allows for a reduced-dimension description of a body of pattern data to be representative of the original body of data. The corresponding answer is known for the linear case, but is more difficult to detail in the general nonlinear case.

A start of the evolution leading to the subject invention may be by noting the concept of principal component analysis based on the Karhunen-Loeve (K-L) transform. Eigenvectors of a data co-variance matrix provide a basis for an uncorrelated representation of associated data. Principal components are those which have larger eigenvalues, namely those features (in transformed representation) which vary greatly from pattern to pattern. If only a few eigenvalues are large, then a reduced dimension representation is suitably fashioned in terms of those few corresponding eigenvectors, and nearly all of the information in the data would still be retained. That utilization of the Karhunen-Loeve transform for PCA purposes has been found to be valuable in dealing with many non-trivial problems. But in pattern recognition, it has a failing insofar as what is retained is not necessarily that which helps interclass discrimination.

Subsequent and somewhat related developments sought to link the ideas of PCA, K-L transform and linear neural networks. Such efforts sought to accomplish a linear K-L transform through neural-net computing, with fully-connected multilayer feedforward nets with the backpropagation algorithm for learning the weights, or with use of a Generalized Hebbian Learning algorithm. In this system, given a correct objective function, weights for the linear links to any of the hidden layer nodes may be noted to be the components of an eigenvector of the co-variance matrix. Earlier works also described how principal components may be found sequentially, and how that approach may avoid a tedious task of evaluating all the elements of a possibly very large co-variance matrix.

The earlier works begged the question of what might be achieved if the neurons in the networks were allowed to also be nonlinear. Other efforts sought to address that question. In one case, the original data pattern vectors are subjected to many layers of transformation in a multilayer feedforward net, but one with nonlinear internal layer nodes. An output layer of such a net has the same number of nodes as the input layer and an objective is to train the net so that the output layer can reproduce the input for all inputs. This provides a so-called auto-associative learning configuration. In addition, one of the internal layers serves as a bottle-neck layer, having possibly a drastically reduced number of nodes. Now, since the outputs from that reduced number of nodes can closely regenerate the input, in all cases, the nodes in the bottle-neck layer might be considered to be a set of principal components. That may prove to be an acceptable viewpoint, except for the fact that the solutions attained in such learning are not unique and differ radically depending on initial conditions and the order in which the data patterns are presented in the learning phase. Although the results are interesting, there is no unique set of principal components.

In another earlier feature map approach, dimension reduction is attained in yet another manner. A reduced-dimension space is suitably defined as two dimensional. The reduced-dimension space is then spanned by a grid of points and a pattern vector is attached to each of those grid points. These pattern vectors are chosen randomly from the same pattern space as that of the problem. Then the pattern vectors of the problem are allocated to the grid points of the reduced-dimension space on the basis of similarity to the reference vector attached to the grid. This leads to a biology inspired aspect of the procedure, namely that of lateral excitation-inhibition. When a pattern vector is allocated to a grid point, at first it would be essentially be at random, because of that grid point happening to have a reference vector most similar to the pattern vector. But once that allocation is made, the reference vector is modified to be even more like that of the input pattern vector and furthermore, all the reference vectors of the laterally close grid points are modified to be more similar to that input pattern also. In this way, matters are soon no longer left to chance; patterns which are similar in the original pattern space are in effect collected together in reduced dimension space. Depending on chance, sometimes two or more rather disparate zones can be built up for patterns which could have been relegated to contiguous regions if things had progressed slightly differently. On the other hand, results of that nature may not be detrimental to the objectives of the computational task.

The ART approach to self-organization of data be mentioned is suitably in this context because the MAX-NET implements a winner-take-all approach in building up clusters and there is indeed lateral inhibition even though it is not related to the distance between cluster centers in cluster space. There is data compression but no dimension reduction.

The subject invention addressed the afore-noted problems, and others, and provides a system for autonomous reduction of pattern dimension data to a largely unambiguous, two-dimensional representation using an extremely efficient system.

SUMMARY OF THE INVENTION

In accordance with the present invention, there is provided a system for organization of multi-dimensional pattern data into a two-dimensional representation that includes a neural network. The neural network is comprised of layers of neural nodes. These layers include an input layer and an output layer and one or more hidden layers disposed therebetween. The output layer is composed of first and second non-linear nodes that share a common internal network representation. Multi-dimensional pattern data is received into the input layer of the neural network. The system generates an output signal at the output layer of the neural network, which output signal corresponds to a received multi-dimensional pattern.

In accordance with another aspect of the present invention, there is provided an organization of multi-dimensional pattern data into a two-dimensional representation to further include a system for completing supervised learning of weights of the neural network.

In accordance with yet a further aspect of the present invention, there is provided a method for organization of multi-dimensional pattern data into a two-dimensional representation which includes the steps of receiving multi-dimensional pattern data into a neural network and outputting, via the neural network which has been trained by backpropagation, an output signal. The output signal is generated by an output layer which consists of first and second non-linear nodes which share a common internal network representation.

In accordance with a more limited aspect of the method of the subject invention, there is provided the steps of completing a training of the neural network to accomplish the foregoing.

An advantage of the present invention is the provision of a neural network which allows for automated creation of a two-dimensional representation of pattern data.

Yet another advantage of the present invention is the creation of a two-dimensional representation of pattern data which isolates related characteristics disposed within the pattern data in an un-ambiguous fashion so as to allow for human visualization and cataloging of features.

Yet another advantage of the present invention is the provision of a neural network for organization of pattern data efficiently so as to allow for real-time computation with conventional processing hardware.

Further advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment and method of which will be described in detail in this specification and illustrated in the accompanying drawings which form a part hereof, and wherein:

FIG. 12 illustrates a table of time-dependent sensor data profiles; and

DETAILED DESCRIPTION OF THE PREFERRED EMBODIMENT

Figure 1:
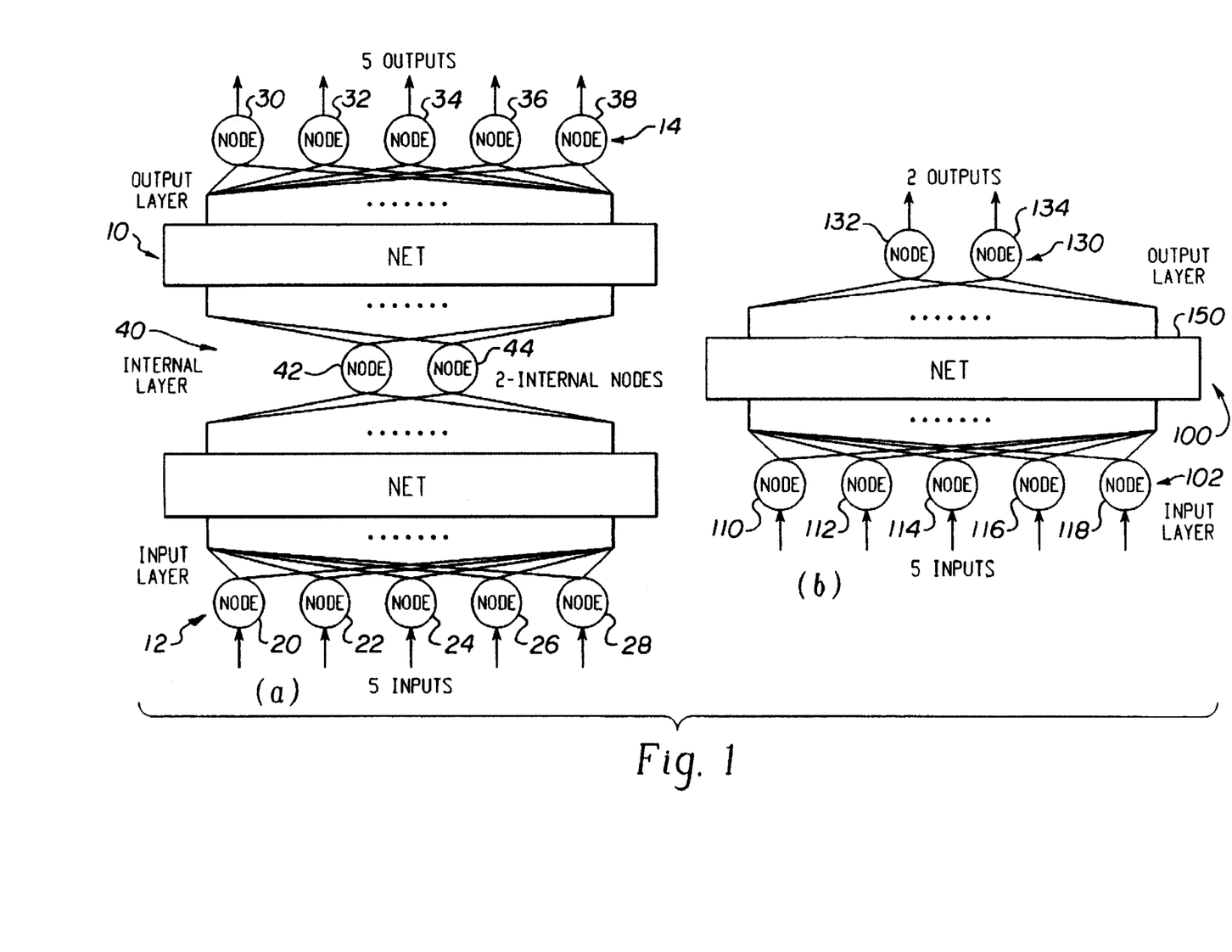
FIGS. 1(a) and 1(b) illustrate an earlier, auto-associative network relative to the subject non-linear variance-conserving mapping with dimension reduction employed by the preferred embodiment of the subject invention.

Referring now to the drawings wherein the showings are for the purposes of illustrating the preferred embodiment of the invention only and not for purposes of limiting same, FIG. 1 illustrates, in portion (a) an auto-associated approach while portion (b) illustrates non-linear variance-conserving mapping with dimension reduction as provided by the preferred embodiment. The two will be described independently. The side-by-side illustration for the advantages and distinctions in architecture between the approach (a) of earlier attempts and the architecture of the subject, preferred embodiment.

In the portion (a), a neural network 10 has an input layer 12 and an output layer 14. In the illustration of portion (a), the input layer 12 is comprised of five nodes, 20, 22, 24, 26, and 28, each of which has an associated input thereto. The output layer 14 is also illustrated as being comprised of five nodes, 30, 32, 34, 36, and 38. The number of illustrated nodes in each of the input layer 12 and the output layer 14 is not limited to five. Any plurality may be chosen for such layer and these valves need not be identical. Specific numbers of nodes are highly application specific. An arbitrary internal layer 40 disposed within the neural network 10 is narrowed to two internal nodes 42 and 44. From the illustration, it will be appreciated that there is therefore a funneling or necking of all pattern data that is provided by the illustrated layer 40.

Turning next to portion (b) of the preferred embodiment, neural network 100 includes an input layer 102. Input layer 102, for illustrative purposes only, is noted to comprise a plurality of inputs formed as five input neurons 110, 112, 114, 116, and 118. It will be appreciated that the disclosed architecture of the neural network 100 includes no internal portion analogous to that internal layer 40 provided by portion (a).

The architecture of (b) provides an output layer 130 comprised of first and second neurons 132 and 134. Two neurons are chosen at the output layer 130 by way of example of the preferred embodiment. This choice allows for two-dimensional realization and visualization of the pattern data. It will be appreciated from the description below that the output layer of the preferred embodiment is comprised entirely of non-linear nodes sharing a common internal network representation. As with the description of (a), it is to be appreciated that a number of nodes forming input layer 102 is chosen pursuant to the particular application and hardware choices.

Next, a dimension reduction from 5 to 2 is considered for illustration purposes. In the auto-associative approach, a net such as that shown in FIG. 1(a) would be used and it would be trained so that the net serves as the identity operator. The output vector of the net would always be nearly the same as the input pattern vector. If the intrinsic dimensionality of the data is more then 2D, then the net will be appreciably different from an identity operator. The net is trained in what is sometimes called a self-supervised manner.

The net to be used in the present new approach is less complex. The intent is to conserve as much of the data information as possible with a 2D representation instead of five. The net for computing the 2D representation is simply that illustrated in FIG. 1(b), to be trained according to the criterion that the variance in the 2D representation be as nearly the same as that of the 5D representation. In this approach, it is essential that the outputs nodes be nonlinear and that they share a common internal network representation.

Let $\{x_p\}, p=1,2,\ldots,P$, be a set of data pattern vectors, with total variance given by $$V = (1/P) \sum_{p=1}^{p=P} \sum_{i=1}^{i=s} (x_{ip} - <x_i>)^2 \qquad \text{(Equation 1)}$$

with dimension s=5 originally and where the < > notation denotes the average or mean.

The net shown in FIG. 1(b) is now trained so that the variance calculated in the reduced dimension representation, for the same set of data pattern vectors, is as closely to V as possible.

Using the Backpropagation algorithm for training, the expressions for progressively changing the weights for the output nodes are as usual $$\Delta w_{kj} = (1/P) \sum_{p=1}^{p=P} \Delta w_{p,kj} = (1/P) \sum_{p=1}^{p=P} \eta \delta_{pk} o_j \qquad \text{(Equation 2)}$$

where all the symbols have their usual conventional meanings. The difference between the present case and the standard supervised learning task of neural-net computing comes in the expression for $\delta_{pk}$ which in this case is given by $$\delta_{pk} = \left[ V - (1/P) \sum_q \sum_n (o_{qn} - <o_n>)^2 \right] (o_{pk} - <o_k>) o_{pk}(1 - o_{pk}) \qquad \text{(Equation 3)}$$

In expression (3), V is the variance calculated for the training set of input data patterns, and the double sum within the rectangular brackets yields the variance for the output, reduced-dimension, representation of the same data. The effect of the learning procedure is to try to decrease the delta values while minimizing the difference between the original and reduced-dimension variances as much as possible.

From the illustration of FIG. 1, it will be recalled that the hidden nodes are displayed in area 150 of network 100. As before, for the hidden layer nodes, the expressions for progressively improving the weights for those nodes are $$\Delta w_\mu = \eta \sum_{p=1}^{p=P} o_{pj}(1 - o_{pj}) \left( \sum_k \delta_{pk} w_{kj} \right) o_{pi} \qquad \text{(Equation 4)}$$

The data patterns may be regarded as vectors in pattern space and their components would vary in value depending on the coordinate system used to describe them, or equivalently the basis vectors used to span that space.

It is a fact that the trace of the data co-variance matrix is invariant with respect to linear transformations of the basis vectors spanning the pattern space. The present approach allows the transformation to be nonlinear but nevertheless seeks to conserve the total variance.

Some simplifications can be made in the learning procedure prescribed by expressions (3) and (4). Since interest is in the relative positions of the various patterns, the mean values of each of the features in the original full-dimensional representation is of no significance. Those values can be set to zero in expression (3). This amounts to a bodily shift of the entire distribution of pattern vectors as one rigid body and no relative position information is lost.

Similarly in expression (3), it is suitably decided ahead of time that the reduced-dimension distribution of pattern vectors will be one of zero mean. This removes a somewhat bothersome step of calculating an ever changing mean as learning proceeds. Setting the mean as a condition in the learning amounts to exerting a bodily shift of the relative distribution.

Although expression (3) is retained as such, the variance constraint really amounts to a signal strength constraint. Learning consists of learning a single set of weights which will map all pattern vectors in the same way, striving to make each feature value, in the reduced-dimension space, as close to zero as possible and yet conserve the total signal strength, or equivalently, the (zero mean) variance.

Further theoretical investigations are underway but the present practice must be considered to be motivated and justified more by results rather than by theory. Some representative results are presented in this and subsequent sections of this discussion.

The results for three different approaches to reduced-dimension self-organization are presented in this section for reduction of 3D data to 2D. Of course this is a strange action to pursue if the data are intrinsically 3D. On the other hand, the intrinsic dimension is generally unknown in most cases and so this simple and well controlled exercise might provide some insight as to what happens when the dimensionality of the new representation is less than that of the intrinsic dimensionality.

If points along a three dimensional helix are to be represented in a "self-organized" 2D presentation, what would that presentation look like? In other words what informations are discarded and what are preserved?

Figure 2:
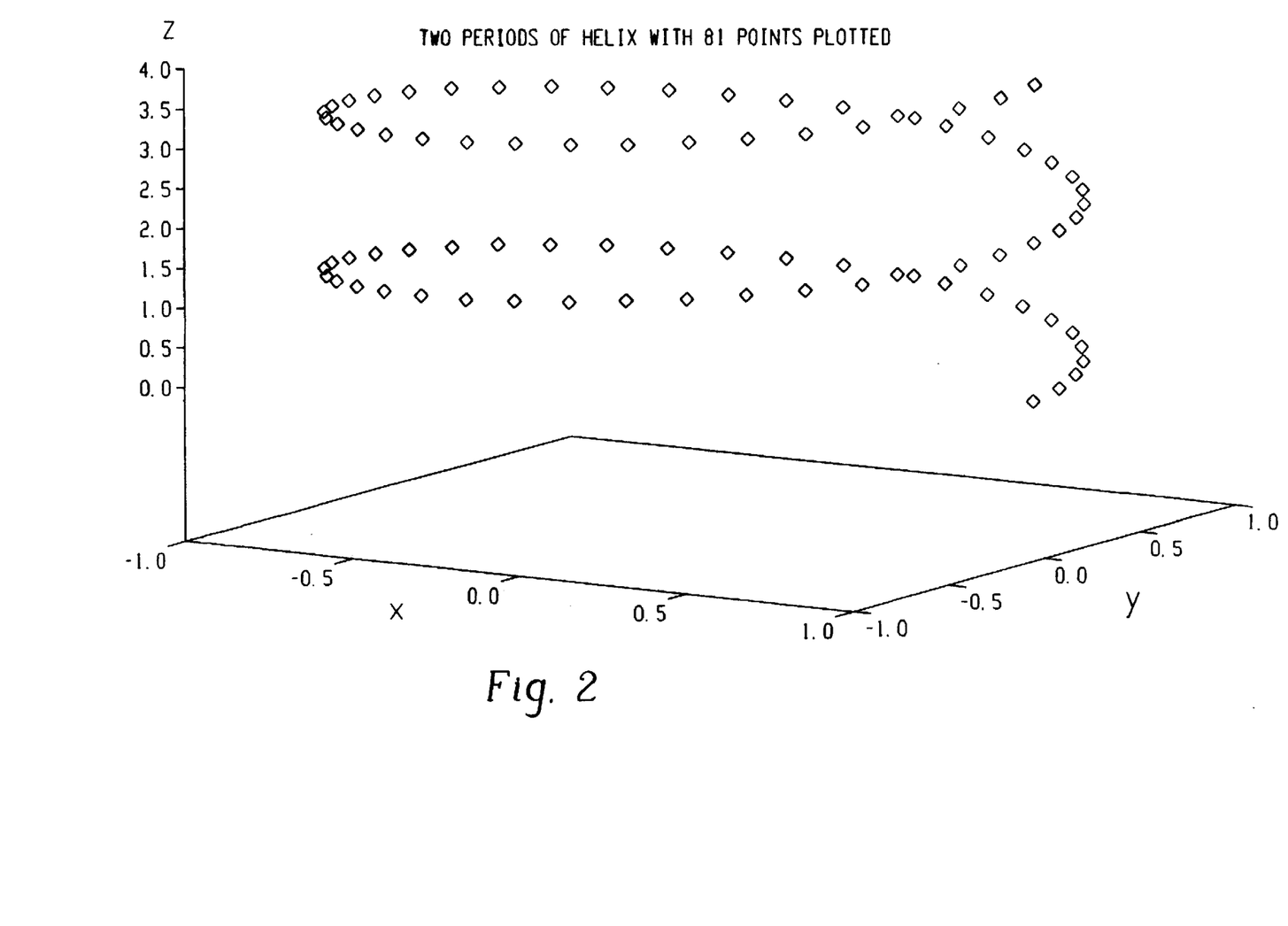
FIG. 2 illustrates a three-dimensional graph of two periods of a helix with 81 points plotted.
Figure 3:
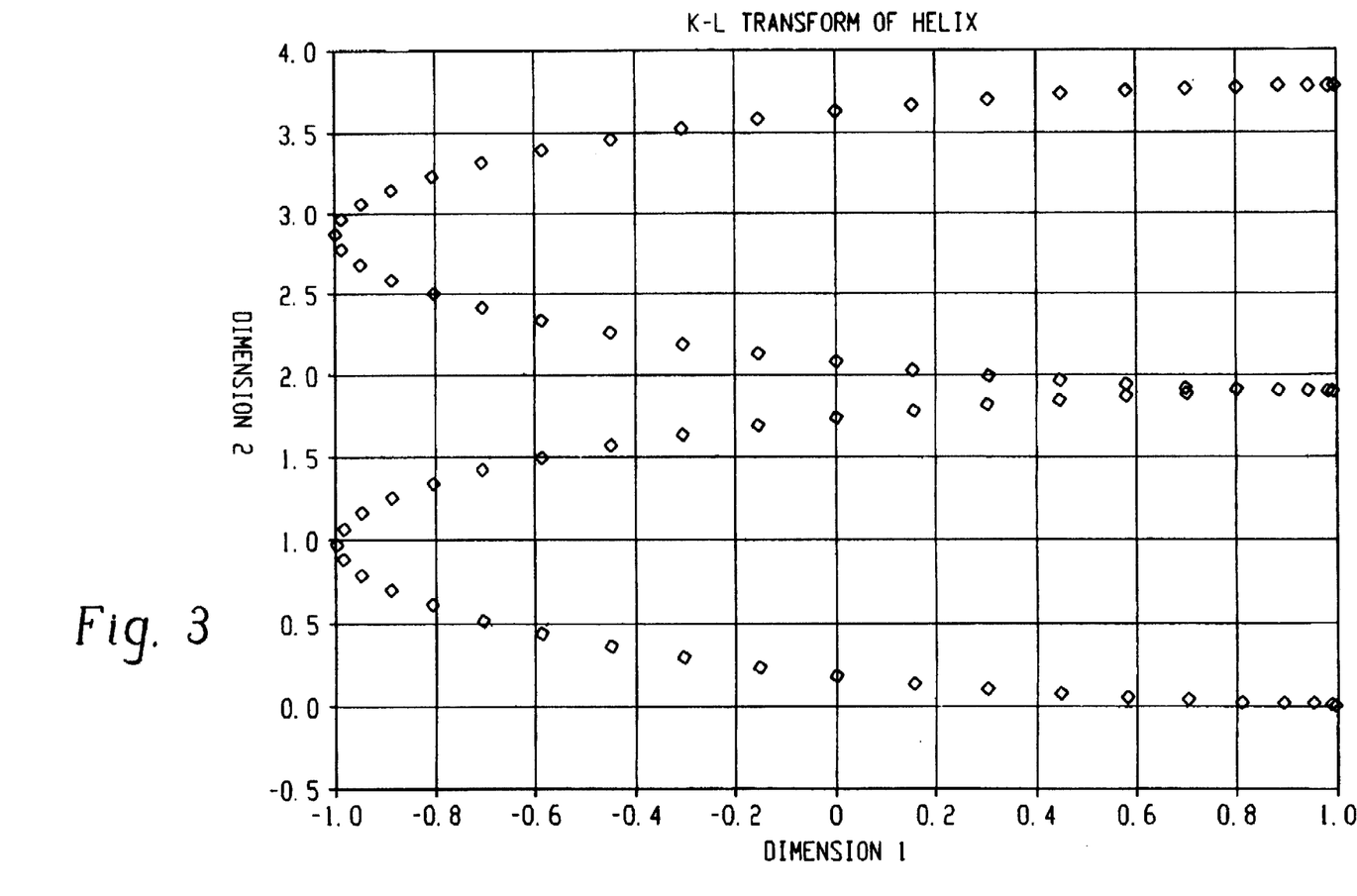
FIG. 3 illustrates a two-dimensional representation of a Karhunen-Loeve transformation of a helix.
Figure 4:
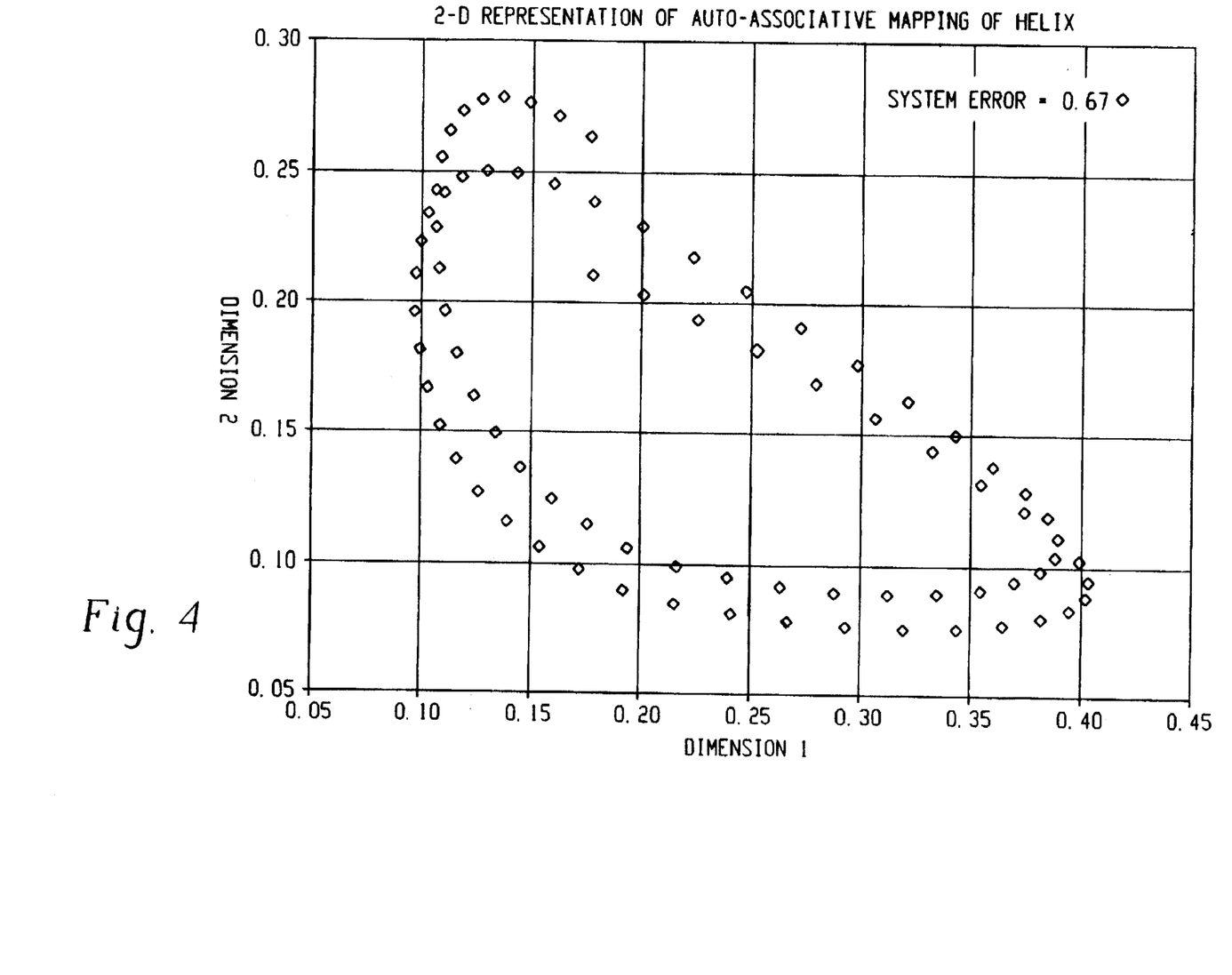
FIG. 4 illustrates a two-dimensional representation of a helix with auto-associative mapping.
Figure 5:
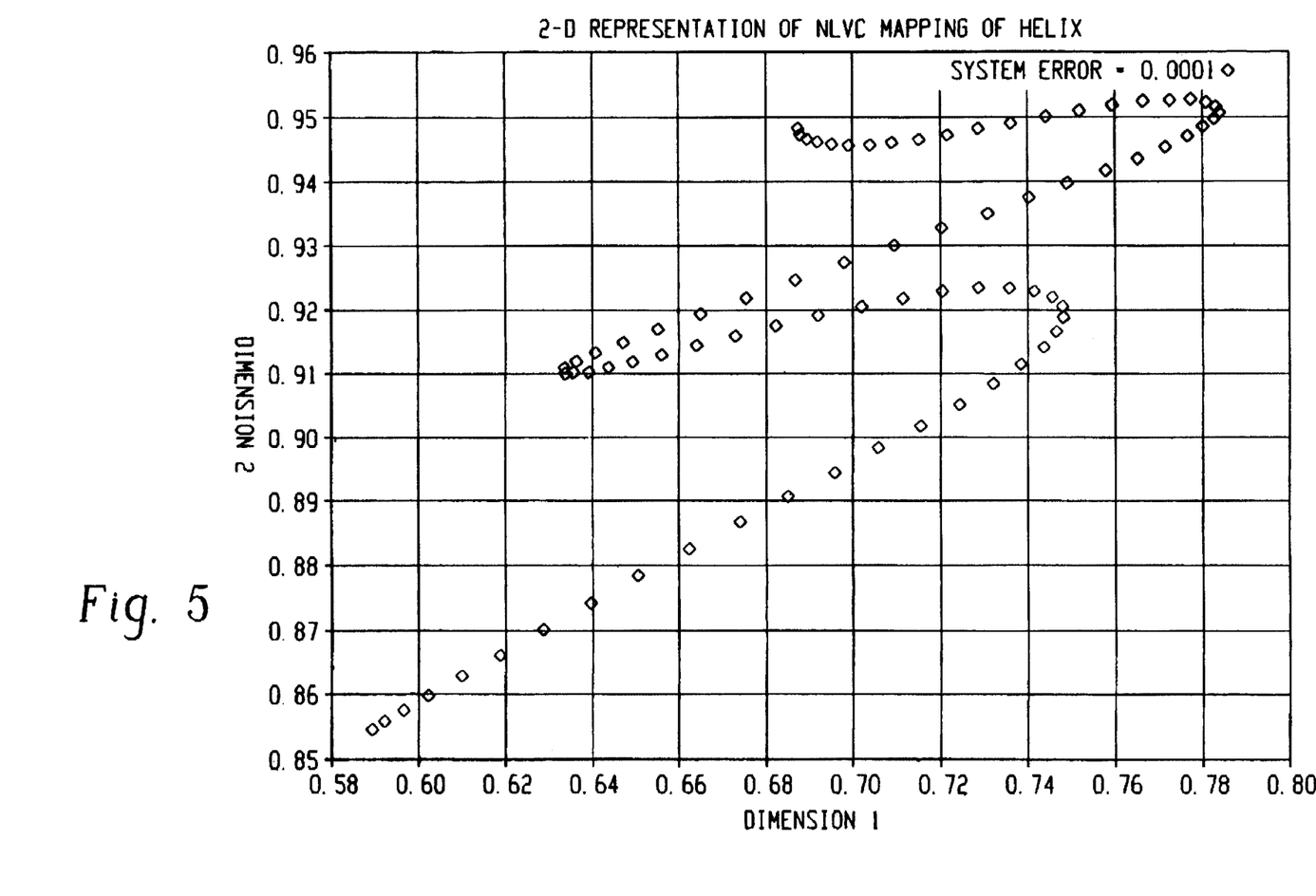
FIG. 5 illustrates a two-dimensional representation of a helix with non-linear variance-conserving mapping.

Data points along a helix are illustrated in FIG. 2. The 2D self-organized K-L depiction of that data is shown in FIG. 3, that obtained with auto-associative mapping is shown in FIG. 4, and the 2D representation obtained with this present approach is shown in FIG. 5.

For this particular case at least, the reduced-dimension representation obtained with this present non-linear variance conservation (NLVC) method is less ambiguous than that obtained with the auto-associative method.

The present work provides dimension-reduction while conserving as much as possible information regarding the inter-pattern differences. The advantages and disadvantages of the K-L, auto-associative, and nonlinear variance-conserving methods are as follows.

THE K-L TRANSFORM METHOD

Advantages—Well understood theoretical basis.

Disadvantages—Lengthy computation of co-variance matrix; linear constraint leads to loss of information when dimension-reduction is large.

THE AUTO-ASSOCIATIVE METHOD

Advantages—theoretical basis conceptually sound; non-linear if desired.

Disadvantages—long training times, easily overtrained to yield misleading mappings.

THE NONLINEAR VARIANCE-CONSTRAINT METHOD

Advantages—conceptually sound, computationally highly efficient, significant dimension-reduction without distortions.

Disadvantages—additional theoretical investigations would be helpful in generalizing the approach and in revealing in what sense the mapping is "topologically" correct; computational results all suggest that order is conserved in some non-trivial manner, but it is difficult to be more precise than that at this point.

Figure 11:
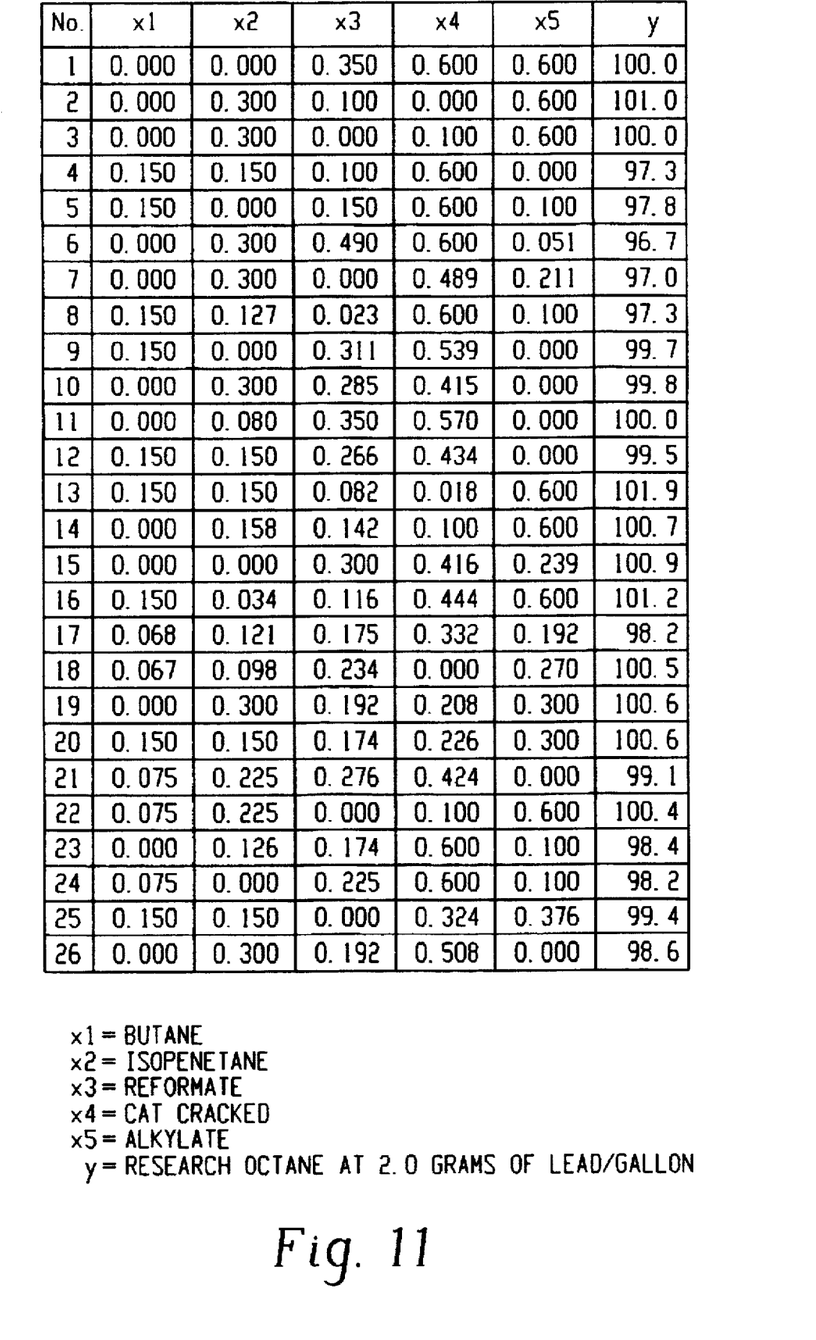
FIG. 11 illustrates a table of benchmark gasoline blending data.

In literature, there is a body of gasoline-blending data which various investigators have used to assess the efficiency of their clustering or classification procedures. An example of such data is exhibited in Table 1 (FIG. 11), where each gasoline blend is described in terms of the amounts of their five constituents and also by its Research Octane Number. That body of five-dimensional data was mapped onto a two-dimensional space using the present NLVC approach. The resulting body of data is now easily displayed and viewed in two dimensions as shown in FIG. 6, with non-trivial gain in the understanding of what the data signify.

Figure 6:
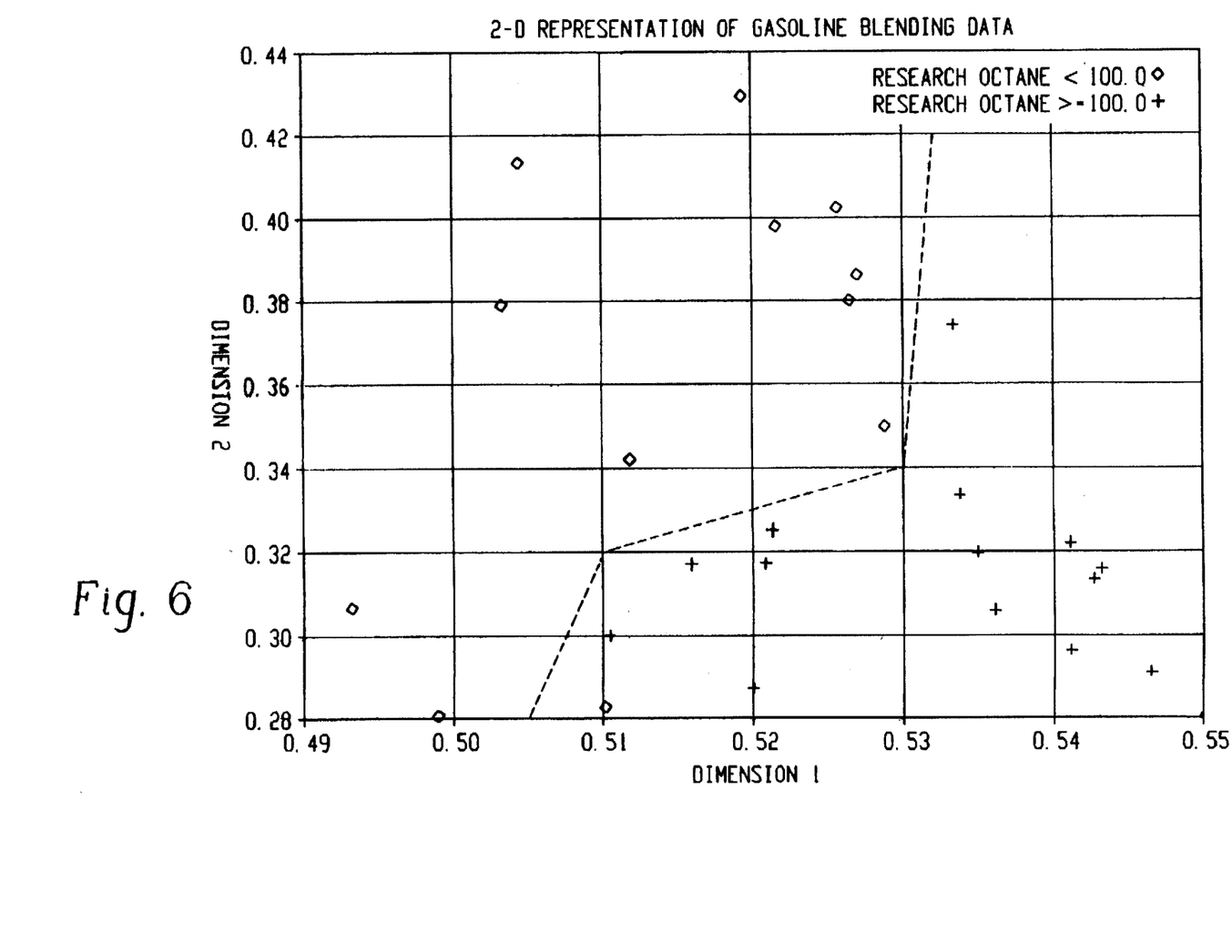
FIG. 6 illustrates a two-dimensional representation of gasoline blending data with non-linear variance-conserving mapping.

Such a plot will suitably serve as a memory as well as a classification rule formulation device, as indicated by the drawing of the lines in FIG. 6, lines which seem to separate the high-octane blends from the low octane ones. In addition, in such a plot, it is readily discerned that three of the blends do not conform with the suggested "rule." It is interesting that similar violations of rules were observed in mappings obtained with the K-L and auto-associative methods.

Figure 7:
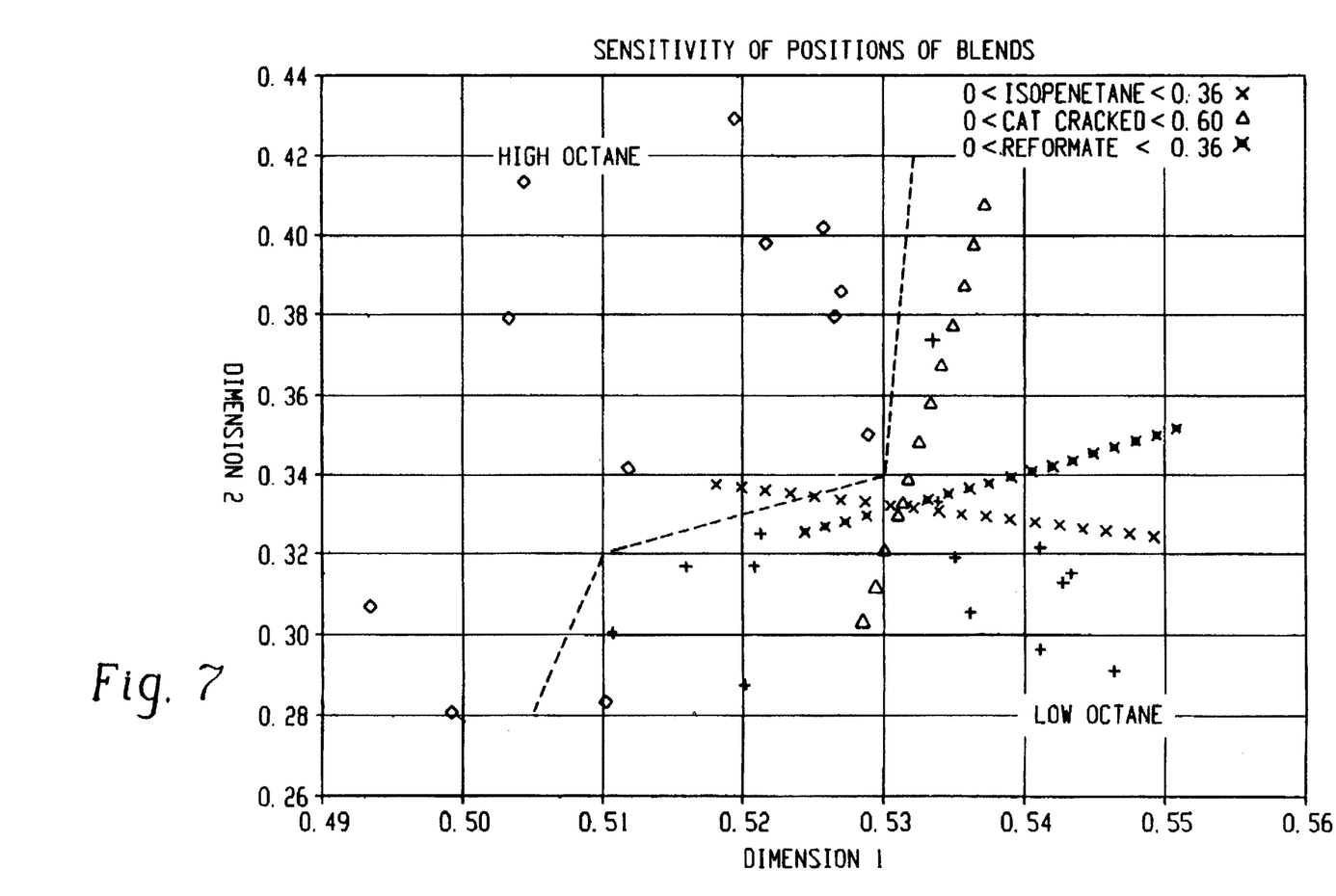
FIG. 7 illustrates a sensitivity of positions of blends with respect to isopenetane, cat cracked, and reformate.

The sensitivity of the location of a point in the two-dimensional space to changes in the original five-dimensional space can be explored readily and some indications of that are depicted in FIG. 7. Such information provides guidance on how other improved blends might be formulated in various different composition regions.

The present NLVC dimension-reduction system is also suitably used to map complex time-dependent sensor output profiles into points in two dimensional space. In addition, changes in the nature of the profile can be detected as motion of that point in the reduced-dimension space.

In a certain industrial installation, the condition of the process was monitored by sensors and the time-dependent sensor output profiles can be used to provide information as to whether the operation would be in or near "fault" condition. In this study, the profiles from one sensor were reduced to patterns of five features each, as shown listed in Table 2 (FIG. 12). Two bodies of such data were prepared, one for "training" the interpretation mode and the other for testing the usefulness of the interpretation scheme.

Figure 8:
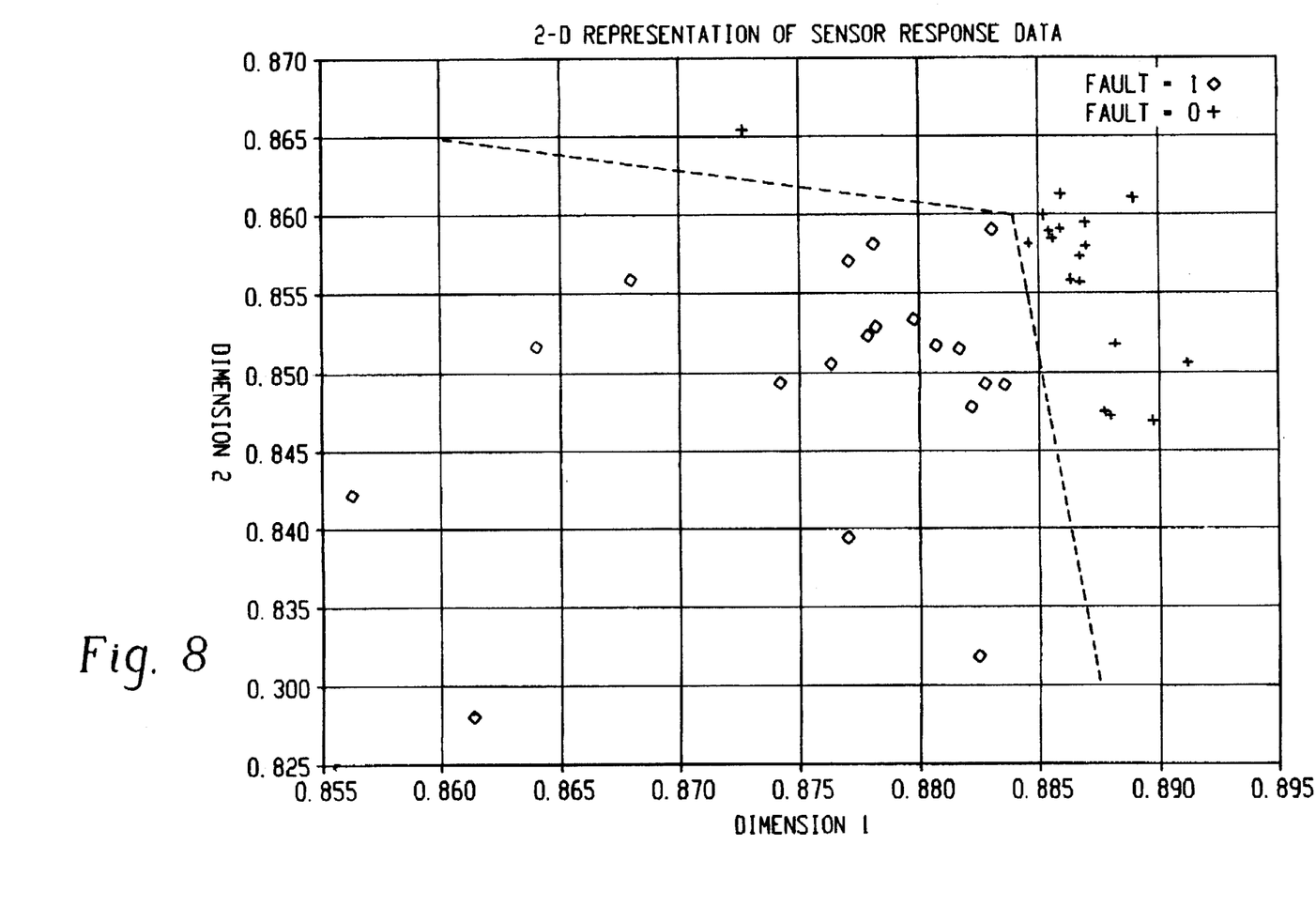
FIG. 8 illustrates a two-dimensional representation of sensor data with non-linear variance-conserving mapping.

Using NLVC mapping, each of the profile patterns was reduced to a 2D point and the entire set of training set profiles can be displayed in a single 2D plot as shown in FIG. 8.

The so-called "training" action amounts to indicating what is known of each point in the two dimensional space, whether that point, representing a sensor output profile, was associated with a "fault" or "no fault" condition.

Figure 9:
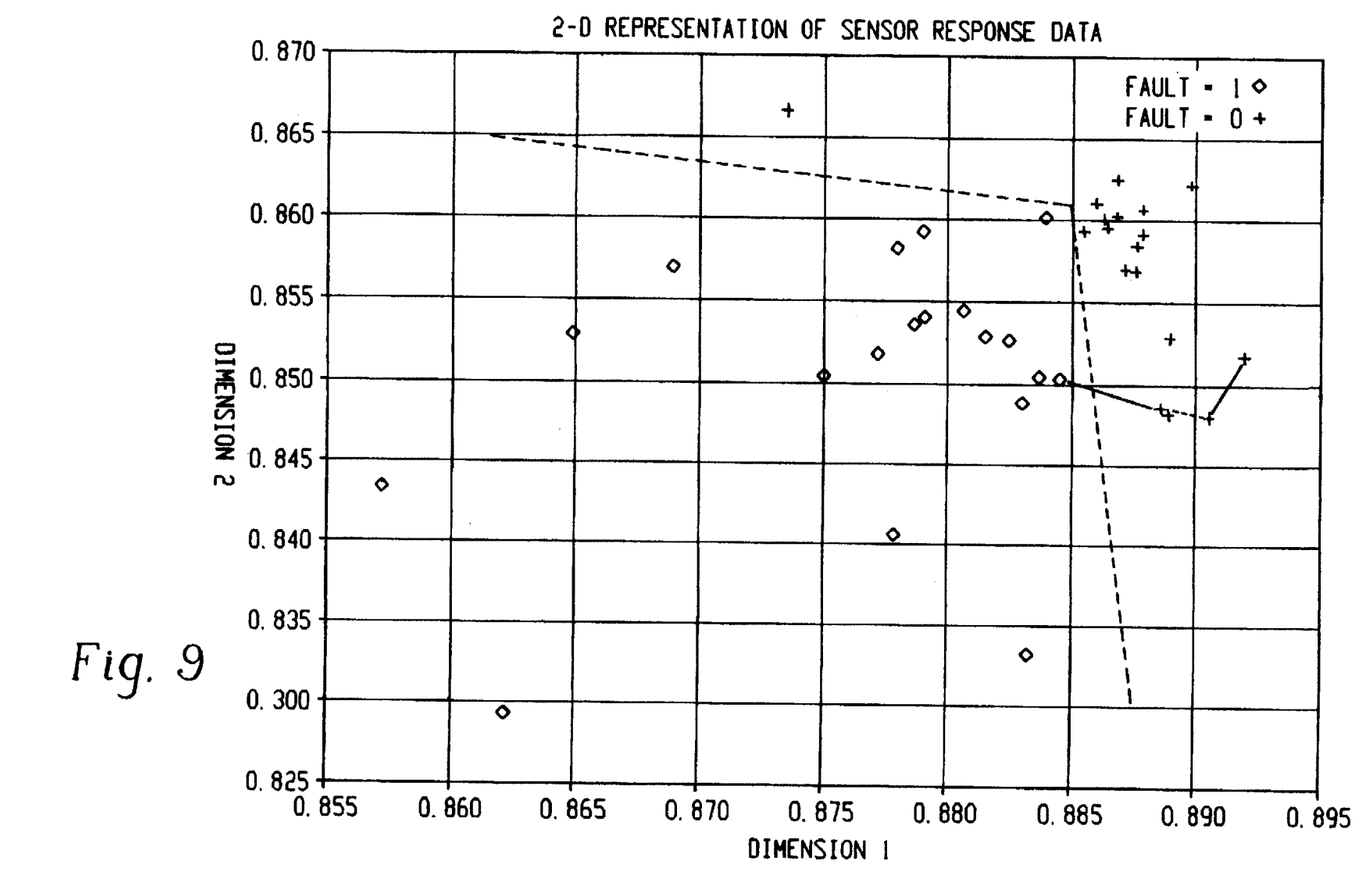
FIG. 9 illustrates a trace of successive sensor profiles monitoring from "non-fault" to "fault;"
Figure 10:
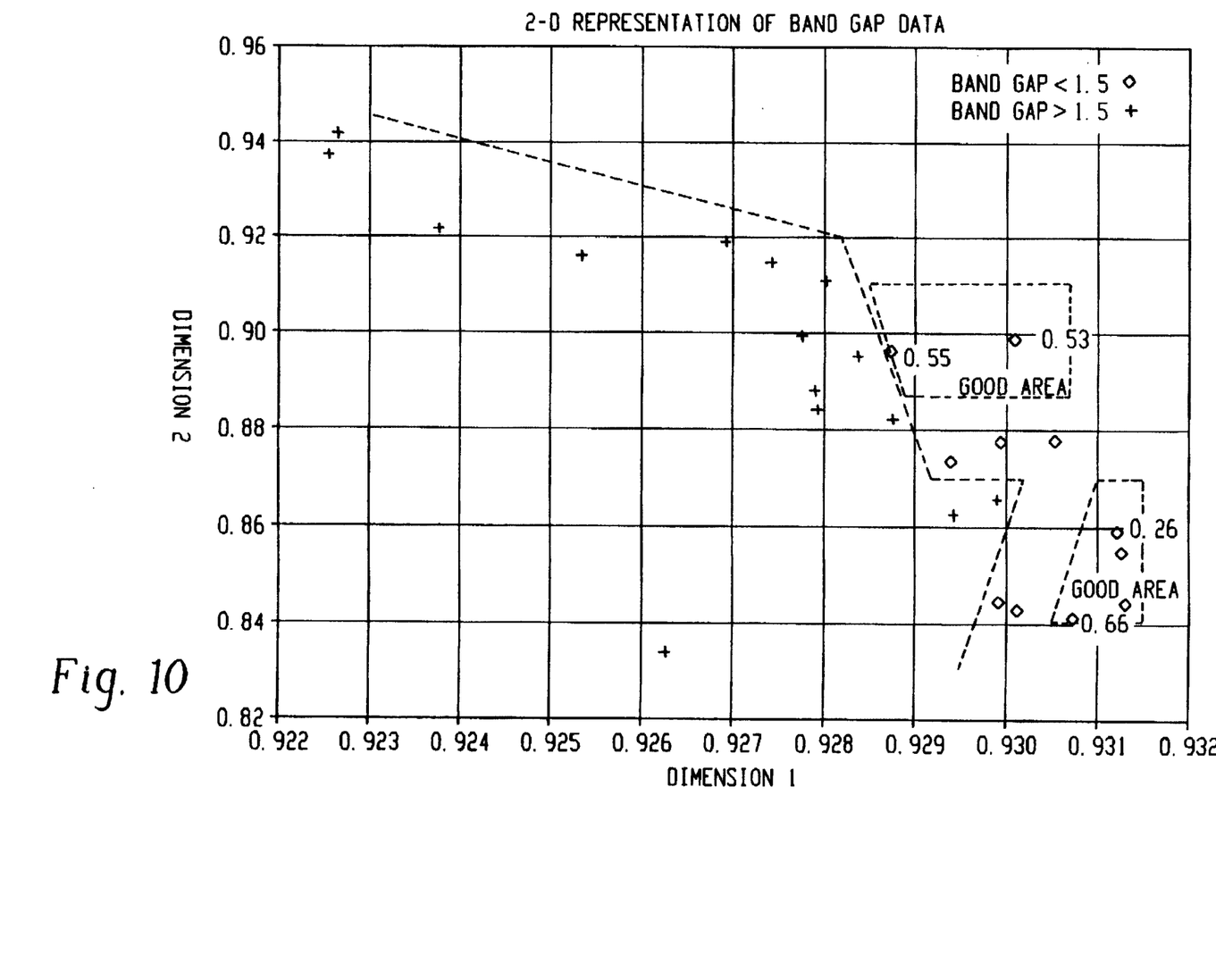
FIG. 10 provides a two-dimensional representation of band gap data with non-linear variance conservation mapping.

It turns out for the data processed, the profiles are indeed representative of "fault" or "no fault" conditions. In the plot of FIG. 8, the points representing the two types of profiles do indeed separate cleanly, albeit not linearly. Given such circumstances, a rule for classifying a new profile as "fault" or "no fault" can be easily formulated. As shown in FIG. 9, such a rule was well validated with points from the test set of profiles.

Figure 13:
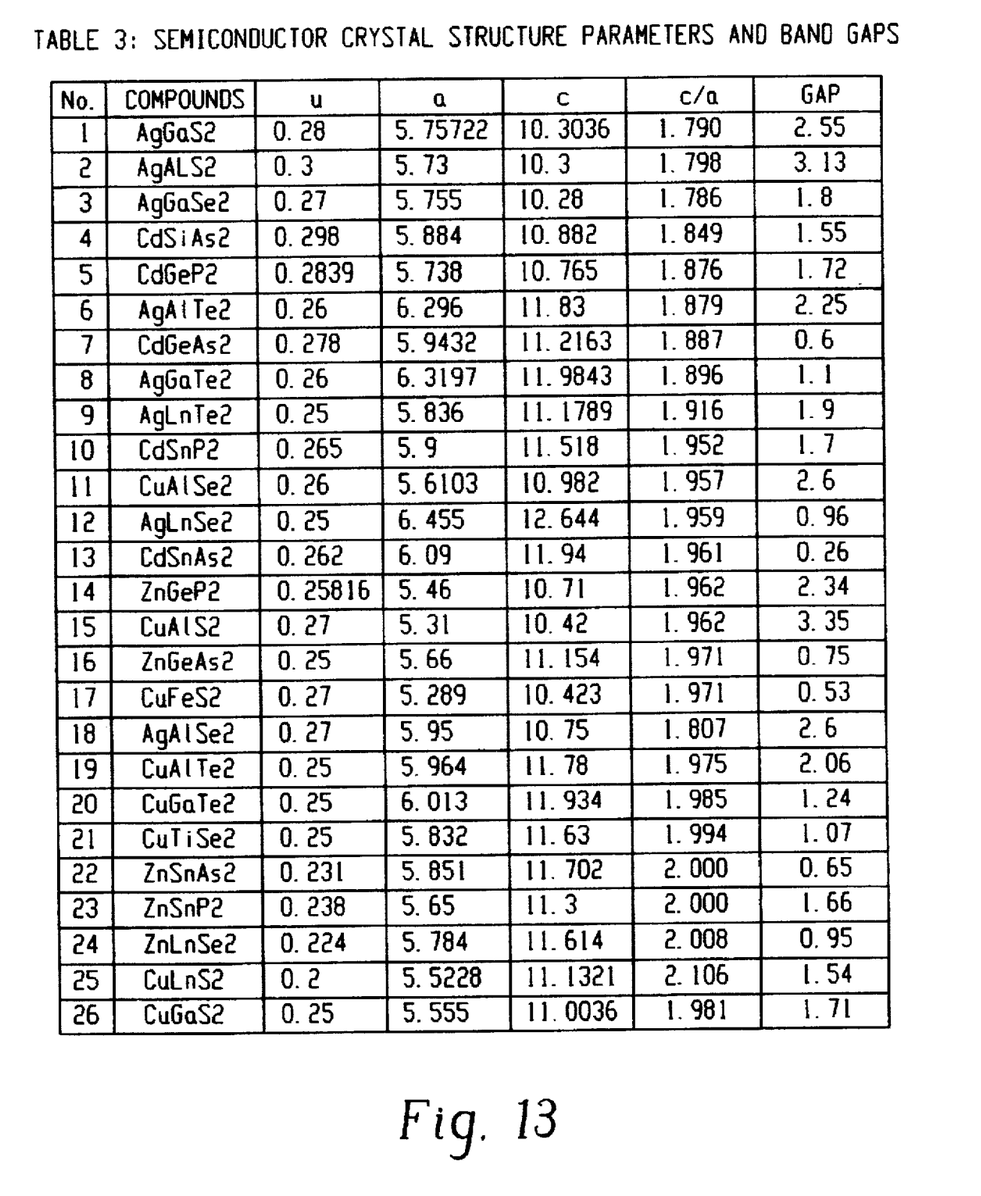
FIG. 13 provides a table of semi-conductor crystal structure parameters and band gaps.

Values of four representative crystal-structure parameters are listed in Table 3 (FIG. 13) for a number of semiconductor materials. Listed also are values of the "band-gap" in the electronic band structure of such materials.

NLVC mapping of the four-feature crystal-structure patterns yielded the map shown in FIG. 9. The low band-gap materials seem to lie towards the upper left portion of the map and study of that distribution might give some hint as to what combinations of crystal structure might be associated with low band-gap.

The subject system is disclosed with particular emphasis on two-dimensional displays as they are especially easy to comprehend. Three dimensional displays are suitably accommodated by humans as well. But all higher dimensional displays are opaque to visualization and to "understanding."

This new method is extremely efficient computationally. Experimental results indicate that it is "topologically correct" in some powerful and attractive manner.

The subject system seeks to conserve all the original variance while carrying out a nonlinear mapping to a reduced-dimension space. Maps obtained in the foregoing manner are suitably used for a variety of tasks, and can even be used as a visual associative memory, suitable for storing similar descriptions of objects and of time histories of the evolution of objects in associated manner, so that the mapping of a new object into a region of the memory would give hints as to what other matters one should be reminded of.

In K-L transform related approaches, the objective is to find a reduced-dimension mapping of the data, for which the components of the data pattern vectors in the new representation are uncorrelated and much of the variance of the data is retained.

It is seen that this approach yields results similar to that of the feature map method, in an interesting manner. It happens that patterns which have similar research octane ratings are mapped automatically into contiguous regions in the 2D reduced dimension mapping. There is no thought of clusters. Instead a rather general category identification rule can easily be formulated. However the reduced-dimension map does provide guidance towards the formulation of improved blends.

Application of the method to complex sensor data indicate once again that patterns representing fault conditions are located in clearly self-organized regions of the 2D maps, distinct from the patterns representing "no-fault."

In the cases mentioned, the category or property value must have been associated strongly with the pattern descriptions. The reduced-dimension mapping merely makes that circumstance more obvious and more easily visualized. In yet another case, this same approach was applied to a sparse body of data, sparse in the sense of not having many exemplars but also sparse in the sense that many feature values were missing so that in fact only a small subset of features were available for this exercise. The data were for a body of crystal structure parameters for semiconductors and there was interest in seeing whether certain regions of crystal structure "space" was associated with low band-gaps. The reduced 2D map did give hints as to what regions might be fruitful for further exploration.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A system for organization of multi-dimensional pattern data into a two-dimensional representation comprising:
   a neural network comprised of a plurality of layers of nodes, the plurality of layers including:
      an input layer composed of a plurality of nodes, and
      an output layer composed of first and second non-linear nodes sharing a common internal network representation;
   receiving means for receiving multi-dimensional pattern data into the input layer of the neural network;
   means for generating an output signal at the output layer of the neural network corresponding to received multi-dimensional pattern data; and
   training means for completing a training of the neural network, wherein the training means includes means for completing the training of the neural network via backpropagation for progressively changing weights for nodes of the output layer,
   the receiving means including means for receiving the multi-dimensional pattern data into the input layer of the neural network as a set {xp} of data pattern vectors into an input layer of a neural network, wherein p=1,2, ... ,P and wherein P is defined as a positive integer, and wherein the set of data pattern vectors has a total variance defined as, $$V = (1/P) \sum_{p=1}^{p=P} \sum_{i=1}^{i=g} (x_{ip} - <x_i>)^2$$

wherein $<x_i>$ denotes at least one of the average or mean of $x_i$; and the training means further includes, means for training the neural network by backpropagation by progressively changing weights w at an output layer of the neural network composed of first and second non-linear nodes sharing a common internal network representation in accordance with, $$\Delta w_{kj} = (1/P) \sum_{p=1}^{p=P} \Delta w_{p,kj} = (1/P) \sum_{p=1}^{p=P} \eta \delta_{pk} o_j$$

$$\delta_{pk} = \left[ V - (1/P) \sum_q \sum_n (o_{qn} - <o_n>)^2 \right] (o_{pk} - <o_k>) o_{pk} (1 - o_{pk})$$

2. A system according to claim 1, wherein said neural network further comprises a hidden layer composed of hidden nodes, wherein weights w for each hidden node of the neural network is progressively improved in accordance with, $$\Delta w_{ji} = \eta \sum_{p=1}^{p=P} o_{pj}(1 - o_{pj}) \left( \sum_k \delta_{pk} w_{kj} \right) o_{pi}.$$

3. A system for organizing multi-dimensional pattern data into a reduced dimensional representation comprising:
   a neural network comprised of a plurality of layers of nodes, the plurality of layers including:
      an input layer comprised of a plurality of input nodes, and
      an output layer comprised of a plurality of non-linear output nodes sharing a common internal network representation, wherein the number of non-linear output nodes is less than the number of input nodes;
   receiving means for receiving multi-dimensional pattern data into the input layer of the neural network;
   means for generating an output signal at the output layer of the neural network corresponding to received multi-dimensional pattern data; and
   training means for completing a training of the neural network, wherein the training means includes means for completing the training of the neural network via backpropagation for progressively changing weights for the output nodes,
   the receiving means includes means for receiving the multi-dimensional pattern data into the input layer of the neural network as a set {xp} of data pattern vectors, wherein p=1,2, ... ,P and wherein P is defined as a positive integer, and wherein the set of data pattern vectors has a total variance defined as, $$V = (1/P) \sum_{p=1}^{p=P} \sum_{i=1}^{i=g} (x_{ip} - <x_i>)^2$$

wherein $<x_i>$ denotes at least one of the average or mean of $x_i$; and the training means further includes, means for training the neural network by backpropagation by progressively changing weights w at the output layer of the neural network in accordance with, $$\Delta w_{kj} = (1/P) \sum_{p=1}^{p=P} \Delta w_{p,kj} = (1/P) \sum_{p=1}^{p=P} \eta \delta_{pk} o_j$$

wherein,

-continued
$$\delta_{pk} = \left[ V - (1/P) \sum_q \sum_n (o_{qn} - <o_n>)^2 \right] (o_{pk} - <o_k>) o_{pk}(1 - o_{pk}).$$

4. A system according to claim 3, wherein said neural network further comprises a hidden layer composed of hidden nodes, wherein weights w for each hidden node is progressively improved in accordance with, $$\Delta w_{ji} = \eta \sum_{p=1}^{p=P} o_{pj}(1 - o_{pj}) \left( \sum_k \delta_{pk} w_{kj} \right) o_{pi}.$$

5. A method for effecting the organization of multi-dimensional pattern data into a reduced dimensional representation using a neural network having an input layer composed of a plurality of input nodes, and an output layer composed of a plurality of non-linear output nodes sharing a common internal network representation, the number of non-linear output nodes being less than the number of input nodes, said method comprising:

receiving a set {xp} of data pattern vectors into the input layer of the neural network, wherein p=1,2, . . . ,P and wherein P is defined as a positive integer, and wherein the set of data pattern vectors has a total variance defined as, $$V = (1/P) \sum_{p=1}^{p=P} \sum_{i=1}^{i=g} (x_{ip} - <x_i>)^2$$

wherein $<x_i>$ denotes at least one of the average or mean of $x_i$; and training the neural network by backpropagation by progressively changing weights w at the output layer of the neural network in accordance with, $$\Delta w_{kj} = (1/P) \sum_{p=1}^{p=P} \Delta w_{p,kj} = (1/P) \sum_{p=1}^{p=P} \eta \delta_{pk} o_j$$

wherein, $$\delta_{pk} = \left[ V - (1/P) \sum_q \sum_n (o_{qn} - <o_n>)^2 \right] (o_{pk} - <o_k>) o_{pk}(1 - o_{pk})$$

displaying a multi-dimensional output signal from the output layer of the neural network.

6. A method according to claim 5, wherein said neural network further comprises a hidden layer composed of hidden nodes, wherein weights w for each hidden node of the neural network is progressively improved in accordance with, $$\Delta w_{ji} = \eta \sum_{p=1}^{p=P} o_{pj}(1 - o_{pj}) \left( \sum_k \delta_{pk} w_{kj} \right) o_{pi}.$$

7. A method according to claim 5, wherein said multi-dimensional output signal is a two-dimensional output signal.

8. A method according to claim 7, wherein said two-dimensional output signal includes data points plotting in relation to 2-dimensional axes.

* * * * *